US009043832B2

(12) United States Patent
Wang et al.

(10) Patent No.: US 9,043,832 B2
(45) Date of Patent: May 26, 2015

(54) EARLY WARNING SYSTEM, SERVER AND METHOD

(75) Inventors: Shao-Wen Wang, New Taipei (TW); Shih-Cheng Wang, New Taipei (TW)

(73) Assignee: Zhongshan Innocloud Intellectual Property Services Co., Ltd., Zhongshan (CN)

( * ) Notice: Subject to any disclaimer, the term of this patent is extended or adjusted under 35 U.S.C. 154(b) by 137 days.

(21) Appl. No.: 13/421,867

(22) Filed: Mar. 16, 2012

(65) Prior Publication Data

US 2013/0247093 A1 Sep. 19, 2013

(51) Int. Cl.

| | |
|---|---|
| ***H04N 7/10*** | (2006.01) |
| ***H04N 7/16*** | (2011.01) |
| ***H04N 5/64*** | (2006.01) |
| ***G08B 27/00*** | (2006.01) |

(52) U.S. Cl.

CPC ............ *G08B 27/005* (2013.01); *G08B 27/008* (2013.01)

(58) Field of Classification Search

CPC .................................................... H04N 21/435

USPC .................. 725/33, 25; 235/472.01; 709/217; 348/744

See application file for complete search history.

(56) References Cited

U.S. PATENT DOCUMENTS

| | | | | |
|---|---|---|---|---|
| 2002/0135764 | A1* | 9/2002 | Oka et al. | 356/338 |
| 2003/0117445 | A1* | 6/2003 | Hendricks et al. | 345/810 |
| 2006/0118636 | A1* | 6/2006 | Miles et al. | 235/472.01 |
| 2007/0055559 | A1* | 3/2007 | Clawson | 705/8 |
| 2008/0087445 | A1* | 4/2008 | Wagner | 169/45 |
| 2008/0120637 | A1* | 5/2008 | Deiss | 725/32 |
| 2008/0162666 | A1* | 7/2008 | Ebihara et al. | 709/217 |
| 2010/0319021 | A1* | 12/2010 | Emerson et al. | 725/33 |
| 2010/0328093 | A1* | 12/2010 | Robinson et al. | 340/825.49 |
| 2011/0004892 | A1* | 1/2011 | Dharmaji | 725/9 |
| 2011/0107364 | A1* | 5/2011 | Lajoie et al. | 725/25 |
| 2011/0157486 | A1* | 6/2011 | Murata et al. | 348/744 |
| 2012/0117584 | A1* | 5/2012 | Gordon | 725/19 |
| 2012/0320955 | A1* | 12/2012 | Ueda et al. | 375/219 |
| 2014/0201785 | A1* | 7/2014 | Dharmaji | 725/34 |

FOREIGN PATENT DOCUMENTS

| | | |
|---|---|---|
| CN | 101370028 A | 2/2009 |
| CN | 202154956 U | 3/2012 |

* cited by examiner

*Primary Examiner* — Hunter B Lonsberry
*Assistant Examiner* — Tariq Gbond
(74) *Attorney, Agent, or Firm* — Novak Druce Connolly Bove + Quigg LLP

(57) ABSTRACT

An early warning system is provided. The early warning system includes a plurality of sensors, a server, and an information appliance device. The sensors produce status information. The server produces event information according to the status information of the sensors, transforms the event information into a first multimedia signal, and transmits the first multimedia signal to the information appliance device through a computer network. The information appliance device is connected to a display device, wherein the information appliance device transforms the first multimedia signal into a second multimedia signal capable of displaying through the display device. The disclosure further provides an early warning server, an early warning method, and a computer program product for report information.

11 Claims, 3 Drawing Sheets

EARLY WARNING SYSTEM, SERVER AND METHOD

BACKGROUND

1. Technical Field

The present disclosure relates to an early warning system, and particularly to a system presenting warning messages from sensor information through Internet Protocol television (IPTV) system.

2. Description of Related Art

When an event such as fire or earthquake occurs, warning messages about the event are generally provided by persons such as reporters or civil authorities, while the warning messages are generally provided through broadcasting or through particular devices such as loudspeakers pre-installed in buildings. Hence, the efficiency of providing the warning messages depends on personal factors and the number and manner of disposition of the devices as provided by public authorities. Consequently, providing warning messages cannot be relied upon to inform all persons liable to be affected.

What is needed, therefore, is an early warning system capable of overcoming the limitations described.

BRIEF DESCRIPTION OF THE DRAWINGS

Many aspects of the present disclosure can be better understood with reference to the drawings. The components in the drawing(s) are not necessarily drawn to scale, the emphasis instead being placed upon clearly illustrating the principles of the present disclosure. Moreover, in the drawing(s), like reference numerals designate corresponding parts throughout the several views.

DETAILED DESCRIPTION

Figure 1:
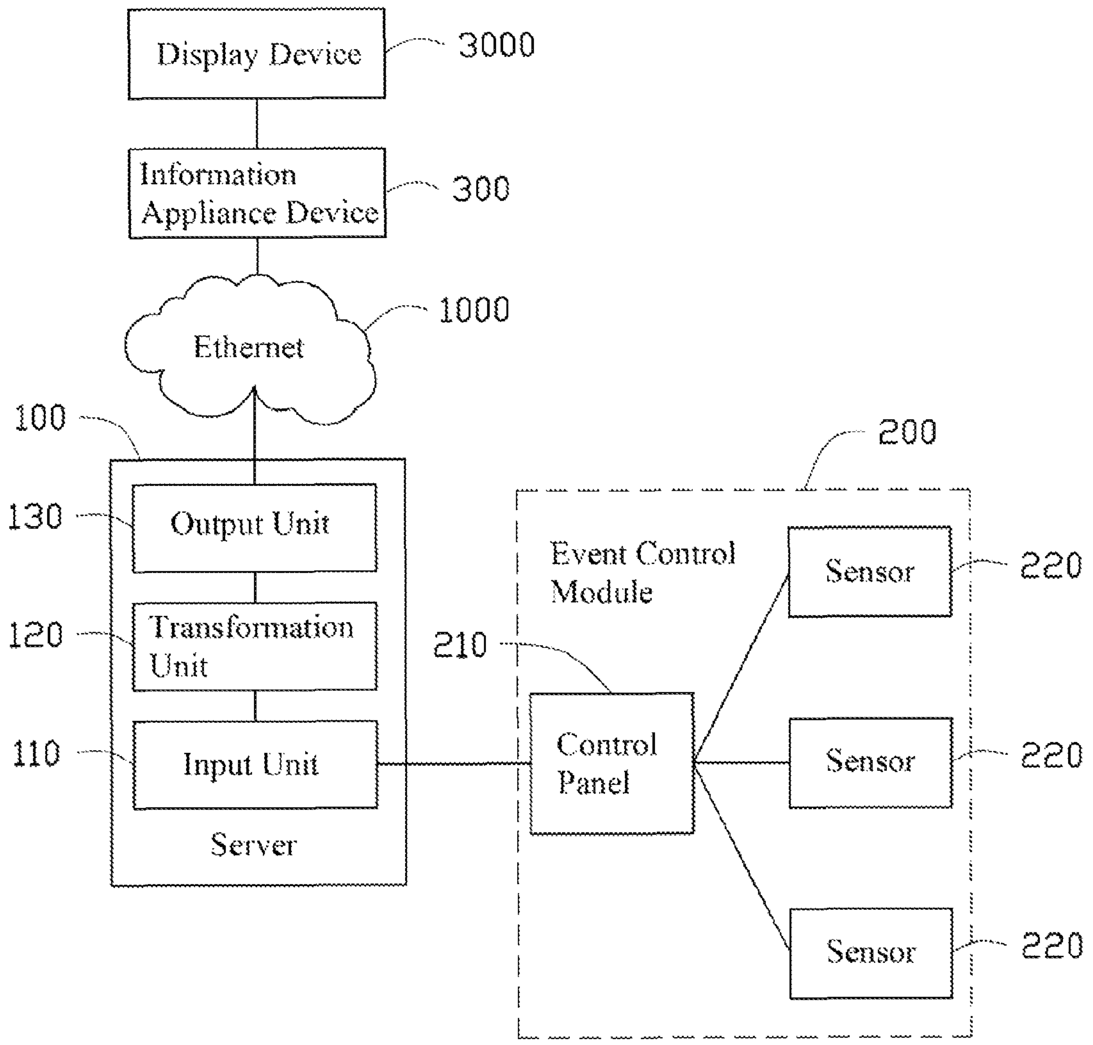
FIG. 1 is a block diagram of an embodiment of an early warning system of the present disclosure.

FIG. 1 is a block diagram of an embodiment of an early warning system of the present disclosure. The early warning system includes a server 100, an event control module 200, and an information appliance device 300. The server 100 includes an input unit 110, a transformation unit 120, and an output unit 130. In the illustrated embodiment, the input unit 110 is a network interface such as a wired network such that the server 100 can communicate with the event control module 200 through a wired network. The output unit 130 is an Ethernet interface, such that the server 100 can communicate with the information appliance device 300 through an Ethernet network 1000. In other embodiments, the input unit 110 can be another type of network or another type of interface such as wireless network interface or signal cable. The output unit 130 can be another type of computer network interface.

In the illustrated embodiment, the event control module 200 includes a control panel 210 and sensors 220. The control panel 210 produces status information Is (not shown) according to the parameters detected by the sensors 220. The sensors 220 are fire sensors such as heat sensors or smoke sensors which react to air temperature and/or smoke density. In other embodiments, the event control module 200 can merely include the sensors 220 which are capable of producing the status information Is on their own account. In addition, the sensors 220 can be climate sensors such as thermometers or anemometers, seismometers (earthquake sensors) or pernicious gas sensors, or security sensors such as pan tilt zoom (PTZ) cameras or thermal imaging cameras, in which parameters relating to climate, earthquakes, floods, or security situations may be preset. Furthermore, the status information Is can be provided by a third-party service provider such as an observatory.

The input unit 110 receives the status information Is from the event control module 200. The transformation unit 120 produces event information Ie (not shown) according to the status information Is, and transforms the event information Ie into a first multimedia signal S1 (not shown) which includes a multimedia data stream of one cable television channel. In the illustrated embodiment, since the status information Is includes temperature and/or smoke density which indicates a fire, the transformation unit 120 determines the location of the fire and the fire alarm level of the fire which is determined by, for example, the intensity or the extent (size) of the fire according to the status information Is, produces the event information Ie by converting the location and the fire alarm level of the fire into texts, images, and/or voice messages, and uses H.264 (that is, MPEG-4 Part 10 or AVC (Advanced Video Coding)) standard to encode the event information Ie into the first multimedia signal S1. In other embodiments, the status information Is can include other types of information such as parameters with regard to climate, earthquakes, floods, or security issues, and another type of video/audio compression standard such as JPEG can be used to encode the event information Ie. The output unit 130 transmits the first multimedia signal S1 to the information appliance device 300 through the Ethernet network 1000.

The information appliance device 300 is connected to a display device 3000 such as a television set or a monitor. The information appliance device 300 can be an IPTV set-top box which contains a tuner for turning video signals into content which can be displayed on a display device. The information appliance device 300 transforms the first multimedia signal S1 into a second multimedia signal S2 corresponding to the cable television channel which can be displayed through the display device 3000. In the illustrated embodiment, the information appliance device 300 uses the H.264 standard to decode the first multimedia signal S1 into the second multimedia signal S2.

Figure 2:
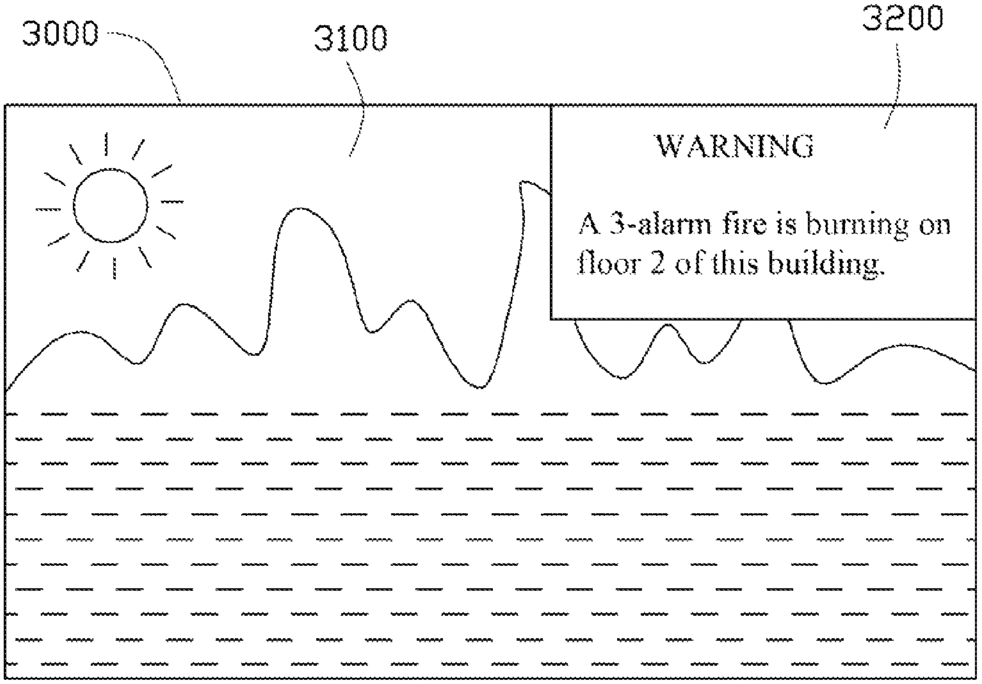
FIG. 2 is a schematic diagram showing the display of a warning message about a fire through the display device shown in FIG. 1.

FIG. 2 is a schematic diagram showing the display of a warning message about a fire through the display device 3000 shown in FIG. 1. In the illustrated embodiment, the information appliance device 300 enables a main channel 3100 such as a television program to display in the main screen of the display device 3000, while the second multimedia signal S2 is presented as an interstitial channel 3200 which shows the location and the fire alarm level of the fire. When receiving the first multimedia signal S1, the information appliance device 300 transforms the first multimedia signal S1 into the second multimedia signal S2, performs a combination operation on the main channel 3100 and the interstitial channel 3200, and enables the interstitial channel 3200 to display in a smaller sub-screen at the top of the main screen 3100. In addition, the information appliance device 300 can enable the cable television channel corresponding to the second multimedia signal S2 to display in the main screen of the display device 3000 in response to, for instance, a control signal from a remote control of the information appliance device 300. Furthermore, the warning message can be audible as well as visible. In other embodiments, the information appliance device 300 can enforce the cable television channel corresponding to the second multimedia signal S2 to display in the main screen of the display device 3000 when receiving the first multimedia signal S1.

In the illustrated embodiment, for a home application, the transformation unit 120 of the server 100 can produce the event information Ie according to evacuation route information, fire-fighting equipment location information, evacuation/shelter/refuge suggestion information, and/or scene status information with respect to the fire which is produced by, for example, a pre-built database or a third-party service provider, such that the evacuation route, the fire-fighting equipment location, evacuation/shelter/refuge suggestion, and/or scene status of the fire can be shown through the interstitial channel 3200. In other embodiments, for a fire-fighting department, the transformation unit 120 can produce the event information Ie according to fire fighting truck route information, water source location information, meteorology information, and/or scene status information useful to that department with respect to a fire. For the police department, the transformation unit 120 can produce the event information Ie according to police patrol car route information, traffic control information, and/or scene status information to facilitate police action. For a hospital application, the transformation unit 120 can produce the event information Ie according to ambulance route information, medical resource information, and/or scene status information useful to a medical authority with respect to medical relief.

Figure 3:
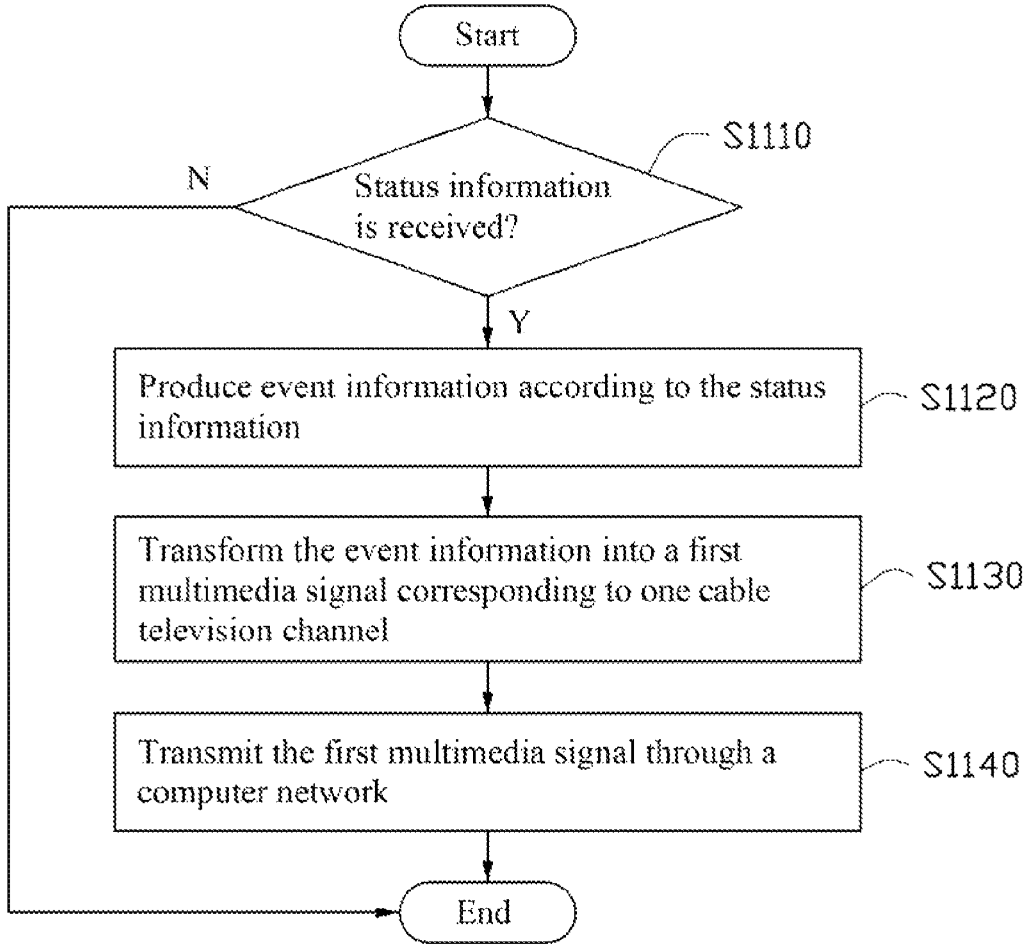
FIG. 3 is a flowchart of an embodiment of an early warning method implemented through the early warning system shown in FIG. 1.

FIG. 3 is a flowchart of an embodiment of an early warning method implemented through the early warning system shown in FIG. 1. The early warning method of the present disclosure follows. Depending on the embodiment, additional steps may be added, others removed, and the ordering of the steps may be changed.

In step S1110, a determination is made as to whether the status information Is is received from the event control module 200. If yes, step S1120 is implemented; otherwise, the method is terminated.

In step S1120, the event information Ie is produced according to the status information Is. In the illustrated embodiment, the status information Is includes fire sensor parameters such as temperature and smoke density. In addition, for a home application, the event information Ie is produced according to evacuation route information, fire-fighting equipment location information, evacuation/shelter/refuge suggestion information, and/or scene status information with respect to the fire, such that the evacuation route, the fire-fighting equipment location, evacuation/shelter/refuge suggestion, and/or scene status of the fire can be shown through a interstitial channel displayed in a smaller sub-screen at the top (or as appropriate) of the main screen of the display device 3000. In other embodiments, the status information Is can include another type of information such as parameters with regard to climate, or security issues.

In step S1130, the event information Ie is transformed into the first multimedia signal S1 corresponding to one cable television channel. In the illustrated embodiment, H.264 standard is used to encode the event information Ie into the first multimedia signal S1. In other embodiments, another type of video/audio compression standard can be used to encode the event information Ie.

In step S1140, the first multimedia signal S1 is transmitted through a computer network such as Ethernet network.

The early warning system and the early warning method utilize IPTV system to present warning messages with regard to the parameters of sensors. Through automatically presenting warning messages with regard to the parameters of sensors in such a popular medium, the warning messages about an event such as a fire can be provided in a direct and automatic manner. Hence, the efficiency to provide the warning messages is enhanced. As a result, for a home user, the warning messages can be obtained in a convenience way. In addition, for professional users such as fire fighters, polices, or medical staffs, essential information about their actions can also be obtained in a simple way.

While the disclosure has been described by way of example and in terms of preferred embodiment, the disclosure is not limited thereto. On the contrary, it is intended to cover various modifications and similar arrangements as would be apparent to those skilled in the art. Therefore the range of the appended claims should be accorded the broadest interpretation so as to encompass all such modifications and similar arrangements.

What is claimed is:

1. An early warning system, comprising:

an information appliance device connected to a display device, wherein the information appliance device transforms a first multimedia signal corresponding to a cable television channel into a second multimedia signal capable of being displayed through the display device;

one or more sensors producing status information regarding a fire or fire-fighting equipment;

and a server producing event information according to the status information of the one or more sensors, transforming the event information into the first multimedia signal through using a video compression standard to encode the event information, and transmitting the first multimedia signal to the information appliance device through a computer network;

wherein the second multimedia signal corresponds to an interstitial channel, the information appliance device enables a main channel to display in the main screen of the display device, when the information appliance device receives the first multimedia signal, the information appliance device performs a combination operation on the main channel and the interstitial channel, and enables the interstitial channel to display in a smaller sub-screen within the main screen.

2. The early warning system of claim 1, wherein the server produces the event information according to at least one of fire sensor information, climate information and security information.

3. The early warning system of claim 1, wherein the server produces the event information according to at least one of evacuation route information, fire-fighting equipment location information, and evacuation/shelter/refuge suggestion information.

4. The early warning system of claim 1, wherein the information appliance device is an Internet Protocol television (IPTV) set-top box.

5. The early warning system of claim 1, further comprising a control panel connected to the one or more sensors.

6. An early warning method, comprising:

receiving status information regarding a fire or fire-fighting equipment from one or more sensors;

producing event information according to the status information;

transforming the event information into a first multimedia signal corresponding to one cable television channel through encoding the event information by using a video compression standard;

transforming the first multimedia signal into a second multimedia signal capable of being displayed through a display device; wherein the second multimedia signal corresponds to an interstitial channel, an information appliance device enables a main channel to display in the main screen of the display device, when the information appliance device receives the first multimedia signal, the information appliance device performs a combination operation on the main channel and the interstitial channel, and enables the interstitial channel to display in a smaller sub-screen within the main screen; and transmitting the first multimedia signal through a computer network.

7. The early warning method of claim 6, wherein the step of producing the event information comprises:

producing the event information according to the status information of the one or more sensors and at least one of fire sensor information, climate information and security information.

8. The early warning method of claim 6, wherein the step of producing the event information comprises:

producing the event information according to the status information of the one or more sensors and at least one of evacuation route information, fire-fighting equipment location information, and evacuation/shelter/refuge suggestion information.

9. The early warning system of claim 1, wherein the server determines the location of a fire according to the status information and produces the event information according to the location of the fire.

10. The early warning system of claim 9, wherein the server determines the fire alarm level of the fire according to the status information and produces the event information according to the fire alarm level of the fire.

11. The early warning method of claim 6, wherein the step of producing the event information comprises:

determining the location of a fire according to the status information; and producing the event information according to the location of the fire.

* * * * *